(12) United States Patent
Zhang et al.

(10) Patent No.: US 9,935,322 B2
(45) Date of Patent: *Apr. 3, 2018

(54) FUEL CELL SYSTEM HAVING CURVED MEMBRANE ELECTRODE ASSEMBLY

(71) Applicants: Tsinghua University, Beijing (CN); HON HAI PRECISION INDUSTRY CO., LTD., New Taipei (TW)

(72) Inventors: Li-Na Zhang, Beijing (CN); Xin-Yu Gao, Beijing (CN); Qi-Yao Yang, Beijing (CN); Kai-Li Jiang, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 146 days.

This patent is subject to a terminal disclaimer.

(21) Appl. No.: 14/970,936

(22) Filed: Dec. 16, 2015

(65) Prior Publication Data

US 2016/0351934 A1 Dec. 1, 2016

(30) Foreign Application Priority Data

May 28, 2015 (CN) .......................... 2015 1 0281229

(51) Int. Cl.
*H01M 8/16* (2006.01)
*H01M 4/88* (2006.01)
(Continued)

(52) U.S. Cl.
CPC ....... *H01M 8/0247* (2013.01); *H01M 4/8626* (2013.01); *H01M 4/8673* (2013.01); *H01M 8/002* (2013.01); *H01M 8/1009* (2013.01); *H01M 8/16* (2013.01); *H01M 8/004* (2013.01); *H01M 8/025* (2013.01); *H01M 8/0252* (2013.01); *H01M 8/1011* (2013.01);
(Continued)

(58) Field of Classification Search
CPC .. H01M 8/002; H01M 8/0247; H01M 8/0606; H01M 8/004; H01M 8/025; H01M 8/1009; H01M 8/1011; H01M 8/16; H01M 8/2475; H01M 4/8626; Y02E 60/527; Y02E 60/523
See application file for complete search history.

(56) References Cited

U.S. PATENT DOCUMENTS

2003/0134169 A1* 7/2003 Sarkar .................... C04B 38/06
429/452
2004/0219411 A1* 11/2004 Yamashita .......... H01M 8/0247
429/456

(Continued)

*Primary Examiner* — Imran Akram
(74) *Attorney, Agent, or Firm* — ScienBiziP, P.C.

(57) ABSTRACT

The disclosure relates to a fuel cell system. The fuel cell system includes a fuel cell module, fuel and oxidizing gas. The fuel cell module includes a container and a membrane electrode assembly located on the container. The container includes a housing and a nozzle connected to the housing. The container defines a number of through holes located on the housing and covered by the membrane electrode assembly. The membrane electrode assembly includes a proton exchange membrane having a first surface and a second surface opposite to the first surface, a cathode electrode located on the first surface and an anode electrode located on the second surface.

20 Claims, 12 Drawing Sheets

(51) Int. Cl.
*H01M 8/06* (2016.01)
*H01M 8/00* (2016.01)
*H01M 8/0247* (2016.01)
*H01M 8/1009* (2016.01)
*H01M 4/86* (2006.01)
H01M 8/1011 (2016.01)
H01M 8/025 (2016.01)
H01M 8/0252 (2016.01)
H01M 8/1018 (2016.01)

(52) U.S. Cl.
CPC .... *H01M 2008/1095* (2013.01); *Y02E 60/523* (2013.01); *Y02E 60/527* (2013.01)

(56) References Cited

U.S. PATENT DOCUMENTS

| | | | | |
|---|---|---|---|---|
| 2005/0026021 | A1* | 2/2005 | Hasegawa | H01M 8/0221 429/414 |
| 2006/0222923 | A1* | 10/2006 | Muramatsu | H01M 8/04208 429/410 |
| 2007/0020497 | A1* | 1/2007 | Ryoichi | H01M 8/04089 429/410 |
| 2009/0092884 | A1* | 4/2009 | Hasegawa | H01M 8/2484 429/421 |
| 2013/0052546 | A1* | 2/2013 | Liu | H01M 8/16 429/401 |
| 2016/0359178 | A1* | 12/2016 | Suzuki | B29C 45/0046 |

* cited by examiner

FUEL CELL SYSTEM HAVING CURVED MEMBRANE ELECTRODE ASSEMBLY

CROSS-REFERENCE TO RELATED APPLICATIONS

This application claims all benefits accruing under 35 U.S.C. § 119 from China Patent Application No. 201510281229.1, filed on May 28, 2015, in the China Intellectual Property Office, disclosure of which is incorporated herein by reference.

FIELD

The subject matter herein generally relates to fuel cell modules and fuel cell systems using the same.

BACKGROUND

Fuel cells can generally be classified into alkaline, solid oxide, and proton exchange membrane fuel cells. The proton exchange membrane fuel cell has received increasingly more attention and has developed rapidly in recent years.

Typically, the proton exchange membrane fuel cell includes a number of separated fuel cell work units. Each work unit includes a fuel cell membrane electrode assembly (MEA), flow field plates (FFP), current collectors plate (CCP), as well as related support equipment, such as blowers, valves, and pipelines. The membrane electrode assembly generally includes a proton exchange membrane, and an anode electrode and a cathode electrode. The proton exchange membrane is sandwiched between the anode electrode and the cathode electrode to form a planar sandwich structure. However, the planar sandwich structure has a relative small contacting surface with fuel and low energy conversion efficiency.

What is needed, therefore, is to provide fuel cells for solving the problem discussed above.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

References will now be made to the drawings to describe, in detail, various embodiments of the present fuel cell modules fuel cell systems using the same, and methods for making the fuel cell systems.

Figure 1:
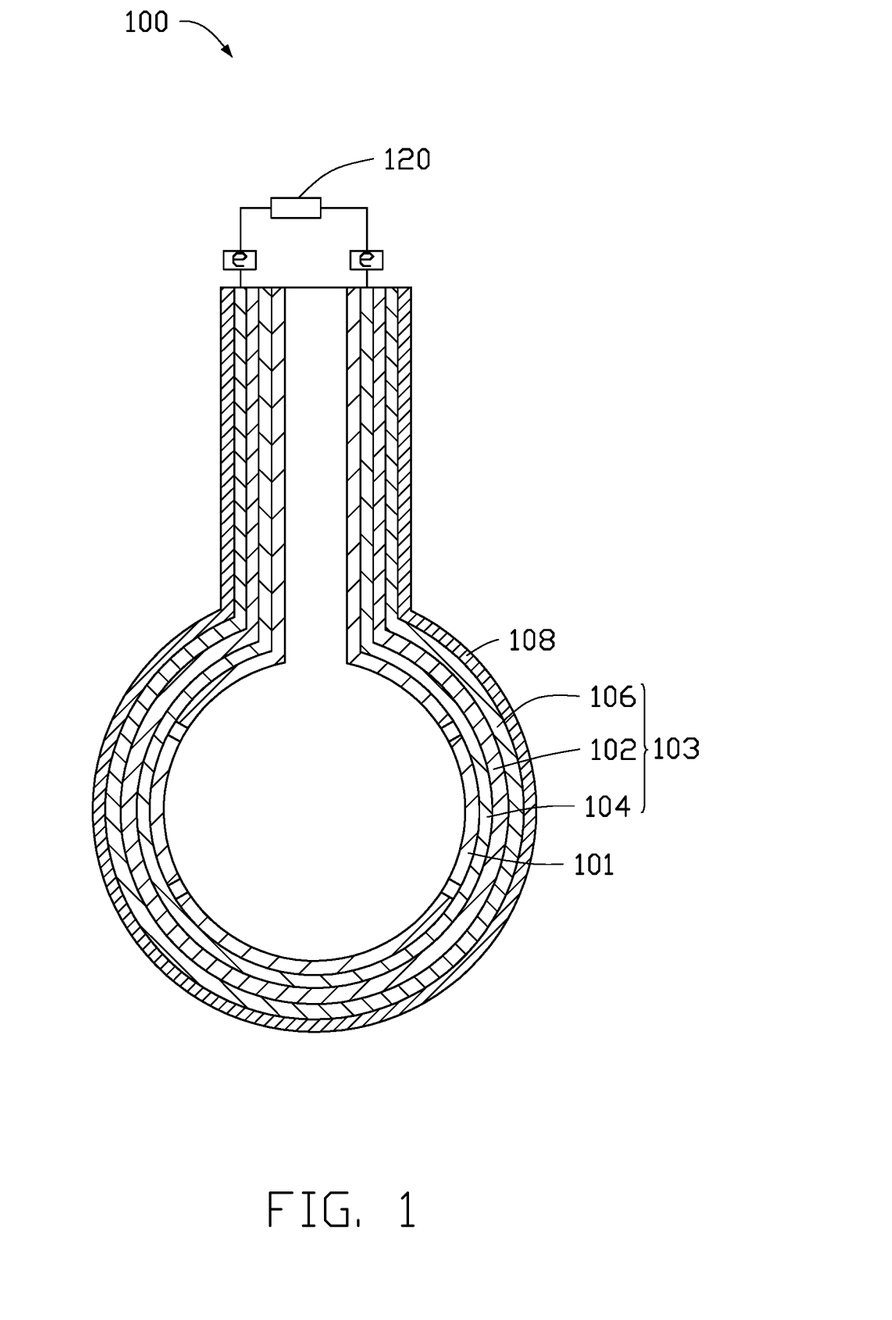
FIG. 1 is a schematic view of one embodiment of a fuel cell module.

Referring to FIG. 1, a fuel cell module 100 of one embodiment includes a container 101 and a membrane electrode assembly 103 located on the container 101. The membrane electrode assembly 103 comprises a proton exchange membrane 102 having two opposite surfaces, a cathode electrode 104 and an anode electrode 106. The cathode electrode 104 and the anode electrode 106 are respectively disposed on the two opposite surfaces of the proton exchange membrane 102.

Figure 2:
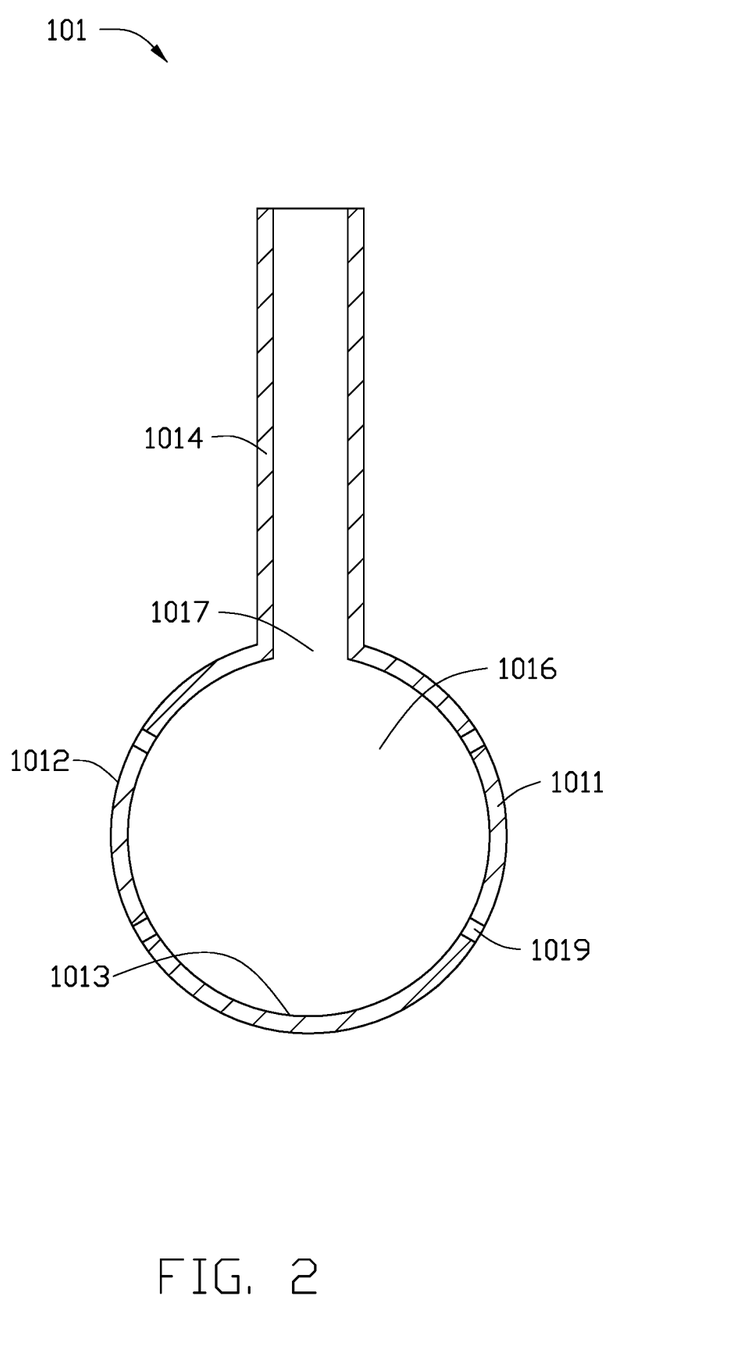
FIG. 2 is a schematic view of one embodiment of a container of the fuel cell module of FIG. 1.

Referring to FIG. 2, the container 101 includes a housing 1011 and a nozzle 1014. The housing 1011 defines a chamber 1016 and an opening 1017. The nozzle 1014 has a first end connected to the opening 1017 and a second end opposite to the first end. The nozzle 1014 extends away from the housing 1011. The chamber 1016 is communicated to outside of the housing 1011 through the nozzle 1014. The nozzle 1014 is configured to input and output a reacting gas, such as oxidizing gas or fuel gas. The container 101 has a plurality of first through holes 1019 on the wall of the container 101. The membrane electrode assembly 103 is disposed on a surface of the container 101 and covers the plurality of first through holes 1019. The container 101 includes an outside surface 1012 and an inside surface 1013 opposite to the outside surface 1012. The membrane electrode assembly 103 can be located on the outside surface 1012 or the inside surface 1013.

The shape of the housing 1011 can be spherical, hemispherical, cylindrical or bellows shape. The container 101 is configured to support the membrane electrode assembly 103 and define the chamber 1016 and the plurality of first through holes 1019. The plurality of first through holes 1019 allows the reacting gas in the container 101 diffuse to the membrane electrode assembly 103. The maximum diameter of the chamber 1016 is greater than the maximum diameter of the nozzle 1014. The ratio between the maximum diameter of the chamber 1016 and the maximum diameter of the nozzle 1014 can be in a range from about 1.5:1 to about 100:1.

In one embodiment, the ratio is in a range from about 5:1 to about 50:1. The container 101 can be made of rigid materials such as metal, ceramic, glass, quartz, diamond, plastic or any other suitable material. In one embodiment, the container 101 is a hollow copper sphere, both the housing 1011 and the nozzle 1014 have the first through holes 1019 thereon, and the membrane electrode assembly 103 is located on outside surface 1012 of the container 101 and covers entire outside surface 1012. The cathode electrode 104 is in direct contact with and covers entire outside surface 1012. The proton exchange membrane 102 covers entire cathode electrode 104. The anode electrode 106 covers entire proton exchange membrane 102. Alternatively, when the membrane electrode assembly 103 is fixed on the outside surface 1012, the anode electrode 106 can be in direct contact with the outside surface 1012.

Figure 3:
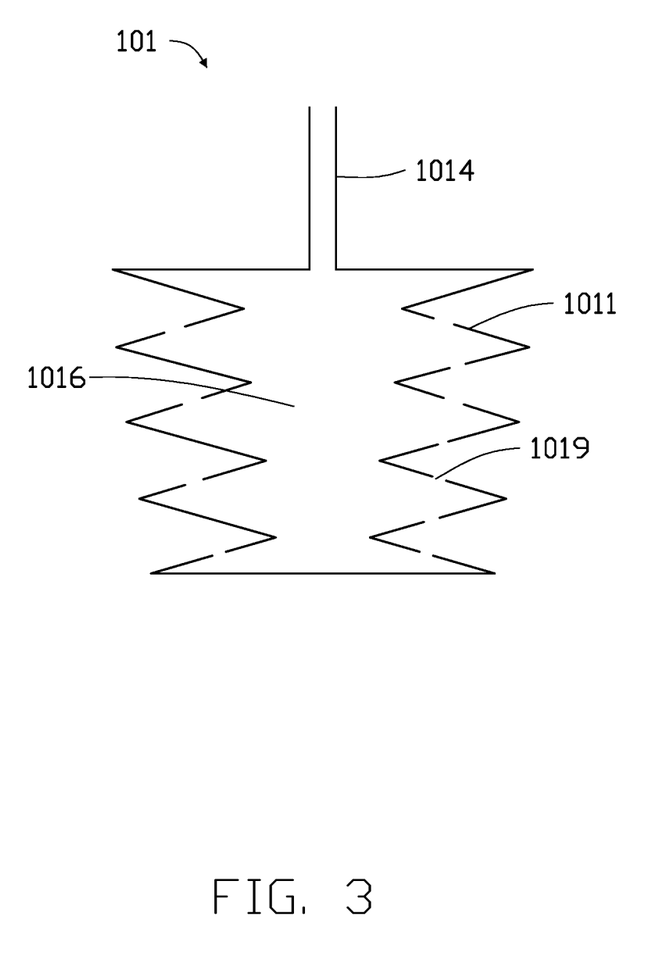
FIG. 3 is a schematic view of one embodiment of a container.

Referring to FIG. 3, in another embodiment, the housing 1011 is a bellows made of polymer. In uses, the bellows shaped housing 1011 can be contracted and stretched along the height direction so the housing 1011 can input and out put reacting gas. Thus, the fuel cell system using the fuel cell module 100 does not need gas supplying and extracting device.

The proton exchange membrane 102 can be perfluorosulfonic acid, polystyrene sulfonic acid, polystyrene trifluoroacetic acid, phenol-formaldehyde resin acid, or hydrocarbons. Each of the cathode electrode 104 and the anode electrode 106 includes a gas diffusion layer (not shown) and catalyst (not shown) dispersed on the gas diffusion layer. In one embodiment, each of the cathode electrode 104 and the anode electrode 106 includes a carbon nanotube layer located on the proton exchange membrane 102 and a catalyst layer located between the proton exchange membrane 102 and the carbon nanotube layer. The catalyst layer includes catalyst materials and carrier. The catalyst materials include metal particles or enzymatic catalyst. The metal particles can be platinum particles, gold particles, ruthenium particles or combination thereof. The distribution of the metal particles is less than 0.5 mg/cm$^2$. The enzymatic catalyst can be oxidase, dehydrogenase or thereof. The carrier can be graphite, carbon black, carbon fiber or carbon nanotubes.

In one embodiment, the carbon nanotube layer is a free-standing structure and can be drawn from a carbon nanotube array. The term "free-standing structure" means that the carbon nanotube layer can sustain the weight of itself when it is hoisted by a portion thereof without any significant damage to its structural integrity. The carbon nanotubes of the carbon nanotube layer can be orderly arranged to form an ordered carbon nanotube structure or disorderly arranged to form a disordered carbon nanotube structure. The term 'disordered carbon nanotube structure' includes, but is not limited to, a structure wherein the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic. The carbon nanotubes in the disordered carbon nanotube structure can be entangled with each other. The term 'ordered carbon nanotube structure' includes, but is not limited to, a structure wherein the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions).

In one embodiment, the carbon nanotubes in the carbon nanotube layer are arranged to extend along the direction substantially parallel to the surface of the carbon nanotube layer so that it is easy to obtain a pattern having greater light transmission. After placement on the proton exchange membrane 102, the carbon nanotubes in the carbon nanotube layer can be arranged to extend along the direction substantially parallel to the proton exchange membrane 102. A majority of the carbon nanotubes in the carbon nanotube layer are arranged to extend along the same direction. Some of the carbon nanotubes in the carbon nanotube layer are arranged to extend along a first direction, and the rest of the carbon nanotubes in the carbon nanotube layer are arranged to extend along a second direction, substantially perpendicular to the first direction.

The carbon nanotube layer can include at least one carbon nanotube film, at least one carbon nanotube wire, or combination thereof. In one embodiment, the carbon nanotube layer can include a single carbon nanotube film or two or more carbon nanotube films stacked together. Thus, the thickness of the carbon nanotube layer can be controlled by the number of the stacked carbon nanotube films. The number of the stacked carbon nanotube films can be in a range from about 2 to about 100. For example, the number of the stacked carbon nanotube films can be 10, 30, or 50. In one embodiment, the carbon nanotube layer can include a layer of parallel and spaced carbon nanotube wires. Also, the carbon nanotube layer can include a plurality of carbon nanotube wires crossed or weaved together to form a carbon nanotube net. The distance between two adjacent parallel and spaced carbon nanotube wires can be in a range from about 0.1 micrometers to about 200 micrometers. In one embodiment, the distance between two adjacent parallel and spaced carbon nanotube wires is in a range from about 10 micrometers to about 100 micrometers.

In one embodiment, the carbon nanotube layer includes at least one drawn carbon nanotube film. A drawn carbon nanotube film can be drawn from a carbon nanotube array that is able to have a film drawn therefrom. The drawn carbon nanotube film includes a plurality of successive and oriented carbon nanotubes joined end-to-end by van der Waals attractive force therebetween. The drawn carbon nanotube film is a free-standing film. Each drawn carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. Some variations can occur in the drawn carbon nanotube film. The carbon nanotubes in the drawn carbon nanotube film are oriented along a preferred orientation. The drawn carbon nanotube film can be treated with an organic solvent to increase the mechanical strength and toughness and reduce the coefficient of friction of the drawn carbon nanotube film. A thickness of the drawn carbon nanotube film can range from about 0.5 nanometers to about 100 micrometers.

The carbon nanotube layer can include at least two stacked drawn carbon nanotube films. In other embodiments, the carbon nanotube layer can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films, whether stacked or adjacent. Adjacent carbon nanotube films can be combined by only the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked drawn carbon nanotube films is larger than 0 degrees, a plurality of micropores is defined by the carbon nanotube layer. The carbon nanotube layer is shown with the aligned directions of the carbon nanotubes between adjacent stacked drawn carbon nanotube films at 90 degrees. Stacking the carbon nanotube films will also add to the structural integrity of the carbon nanotube layer.

In another embodiment, the carbon nanotube layer can include a pressed carbon nanotube film. The pressed carbon nanotube film can be a free-standing carbon nanotube film. The carbon nanotubes in the pressed carbon nanotube film are arranged along a same direction or arranged along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. The greater the pressure applied, the smaller the angle formed. If the carbon nanotubes in the pressed carbon nanotube film are arranged along different directions, the carbon nanotube layer can be isotropic.

In another embodiment, the carbon nanotube layer includes a flocculated carbon nanotube film. The flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to form an entangled structure with micropores defined therein. Sizes of the micropores can be less than 10 micrometers. The porous nature of the flocculated carbon nanotube film will increase the specific surface area of the carbon nanotube layer. Further, due to the carbon nanotubes in the carbon nanotube layer being entangled with each other, the carbon nanotube layer employing the flocculated carbon nanotube film has excellent durability, and can be fashioned into desired shapes with a low risk to the integrity of the carbon nanotube layer. The flocculated carbon nanotube film, in some embodiments, is free-standing due to the carbon nanotubes being entangled and adhered together by van der Waals attractive force therebetween.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. The untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity, and shape. The length of the untwisted carbon nanotube wire can be arbitrarily set as desired. A diameter of the untwisted carbon nanotube wire ranges from about 0.5 nanometers to about 100 micrometers.

The twisted carbon nanotube wire can be formed by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. The length of the carbon nanotube wire can be set as desired. A diameter of the twisted carbon nanotube wire can be from about 0.5 nanometers to about 100 micrometers. Further, the twisted carbon nanotube wire can be treated with a volatile organic solvent after being twisted to bundle the adjacent paralleled carbon nanotubes together. The specific surface area of the twisted carbon nanotube wire will decrease, while the density and strength of the twisted carbon nanotube wire will increase.

In one embodiment, each of the cathode electrode 104 and the anode electrode 106 may include a carbon nanotube layer and a plurality of catalyst particles dispersed in the carbon nanotube to obtain a carbon nanotube composite structure. The cathode electrode 104 can be made by depositing a plurality of metal catalyst particles on a plurality of drawn carbon nanotube films to form a plurality of drawn carbon nanotube film composites and then stacking or twisting the plurality of drawn carbon nanotube film composites. The plurality of metal catalyst particles can be deposited by chemical vapor deposition (CVD), sputtering, or plasma-assisted chemical vapor deposition. The anode electrode 106 can be made by immerging the carbon nanotube layer into a catalyst-containing solution to obtain a carbon nanotube composite structure.

In one embodiment, the anode electrode 106 can be made by: step (a) functionalizing the carbon nanotube layer to form a functionalized the carbon nanotube layer; step (b) putting the functionalized the carbon nanotube layer into the catalyst-containing solution; and step (c) drying the functionalized carbon nanotube layer to obtain a carbon nanotube composite structure.

In step (a), the functionalizing can be performed by treating the carbon nanotube layer with acid such as hydrochloric acid, sulfuric acid or nitric acid. In one embodiment, the carbon nanotube layer is put into a mixture of sulfuric acid and nitric acid and treating by ultrasonic for about 2 hours. Then, the carbon nanotube layer is put into an oxydol and treating by ultrasonic for about 1 hour. Finally, the carbon nanotube layer is put into a water and treating by ultrasonic till a PH value of the become 7.

In step (b) the catalyst-containing solution can be a solution of metal or metal-salt, or a solution of enzymatic. In one embodiment, the catalyst-containing solution is a solution of glucose oxidase. Then, the carbon nanotube layer is put into the solution of glucose oxidase for 1-5 days at the temperature of 4° C.

Furthermore, the fuel cell module 100 includes at least one current collector 108. The current collector 108 is made of conductive material, such as metal, and configured to collect and conduct electrons. The current collector 108 is located on surface of the cathode electrode 104 and/or the anode electrode 106. When the container 101 is made of conductive material, the container 101 can be used as collector. Thus, only one collector 108 is needed. In one embodiment, the container 101 is a made of copper, and the current collector 108 is a copper mesh.

In use, a load 120 can be electrically connected to the cathode electrode 104 and the anode electrode 106. The fuel cell module 100 has following advantages. First, the membrane electrode assembly 103 is located on the container 101 and has a curved or folded surface, thus, the membrane electrode assembly 103 can have relative large contacting surface with fuel or reacting gas. The energy conversion efficiency of the membrane electrode assembly 103 is improved. Second, the container 101 can be used to carry the fuel or reacting gas, and the fuel cell system using the fuel cell module 100 has a simple structure.

Figure 4:
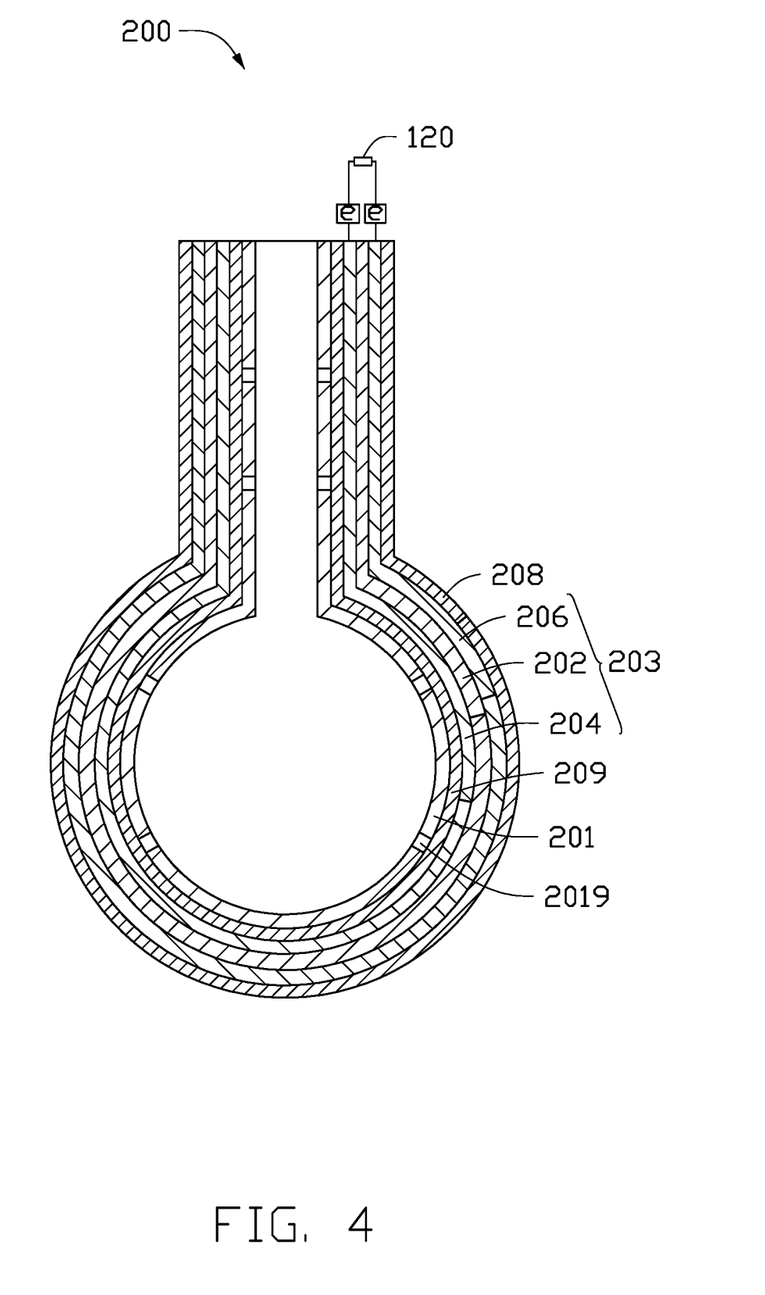
FIG. 4 is a schematic view of one embodiment of a fuel cell module.

Referring to FIG. 4, a fuel cell module 200 of one embodiment includes a container 201, a membrane electrode assembly 203 located on the container 201, a first collector 208, and a second collector 209. The membrane electrode assembly 203 comprises a proton exchange membrane 202 having two opposite surfaces, a cathode electrode 204 and an anode electrode 206.

The fuel cell module 200 is similar to the fuel cell module 100 above except that the container 201 is made of insulative material, and the second collector 209 is located between the container 201 and the membrane electrode assembly 203. The second collector 209 can be formed on the outer surface of the container 201 by bonding, coating or deposition. In one embodiment, the second collector 209 cover entire outer surface of the container 201 and defines a plurality of second through holes (not shown) corresponding to the plurality of first through holes 2019. The first collector 208 cover entire outer surface of the membrane electrode assembly 203 and defines a plurality of third through holes (not shown) allowing the reacting gas to pass through. Both the first collector 208 and the second collector 209 is a copper metal mesh.

Figure 5:
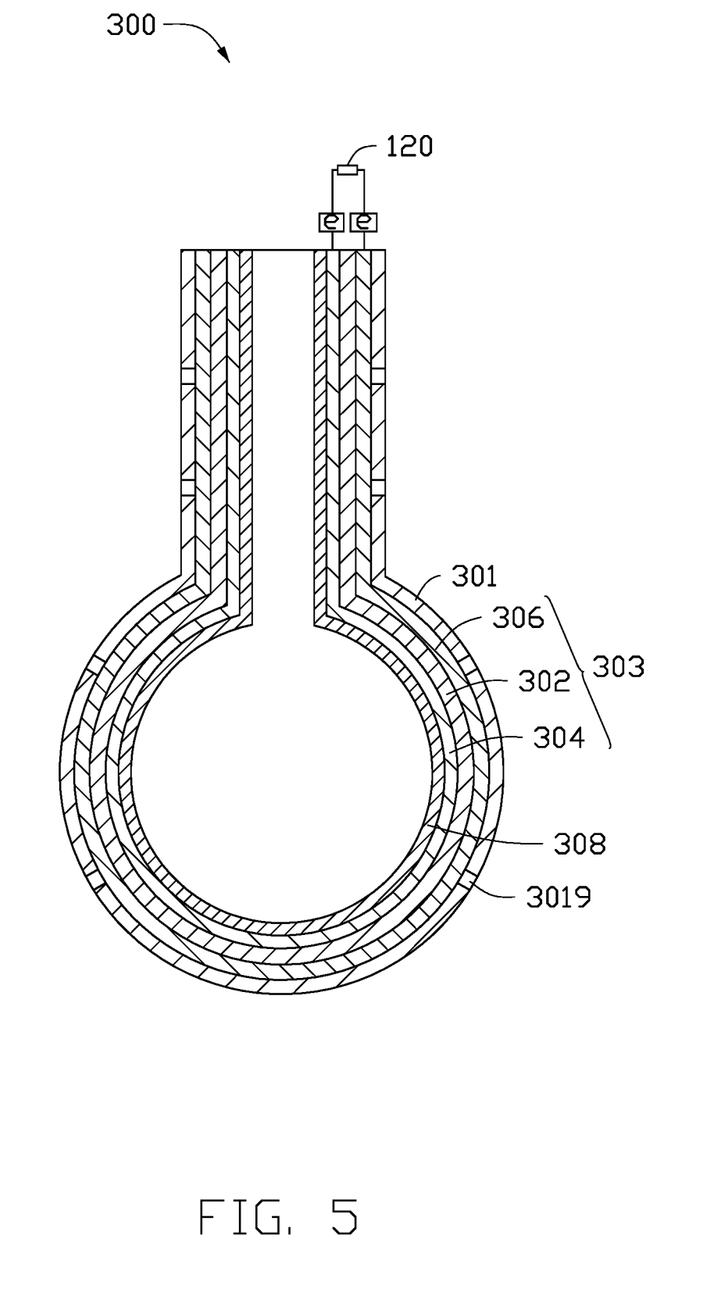
FIG. 5 is a schematic view of one embodiment of a fuel cell module.

Referring to FIG. 5, a fuel cell module 300 of one embodiment includes a container 301, a membrane electrode assembly 303 located on the container 301, and a first collector 308. The membrane electrode assembly 303 comprises a proton exchange membrane 302 having two opposite surfaces, a cathode electrode 304 and an anode electrode 306.

The fuel cell module 300 is similar to the fuel cell module 100 above except that the membrane electrode assembly 303 is located on the inner surface of the container 301 and the first collector 308 is located on the inner surface of the membrane electrode assembly 303. The first collector 308 covers entire inner surface of the membrane electrode assembly 303 and defines a plurality of third through holes (not shown) allowing the reacting gas to pass through. In one embodiment, the container 301 is a hollow copper sphere having a plurality of first through holes 3019. The first collector 308 is a copper metal mesh.

Figure 6:
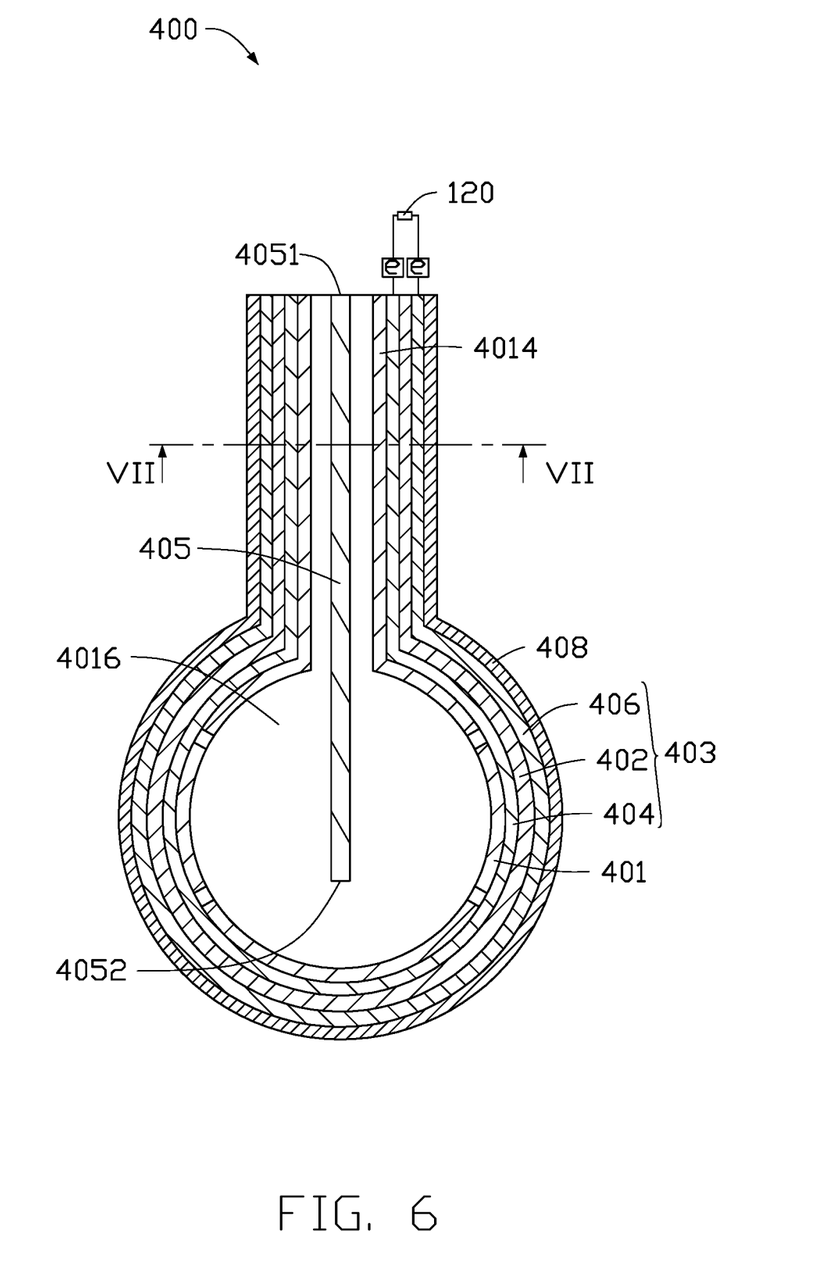
FIG. 6 is a schematic view of one embodiment of a fuel cell module.
Figure 7:
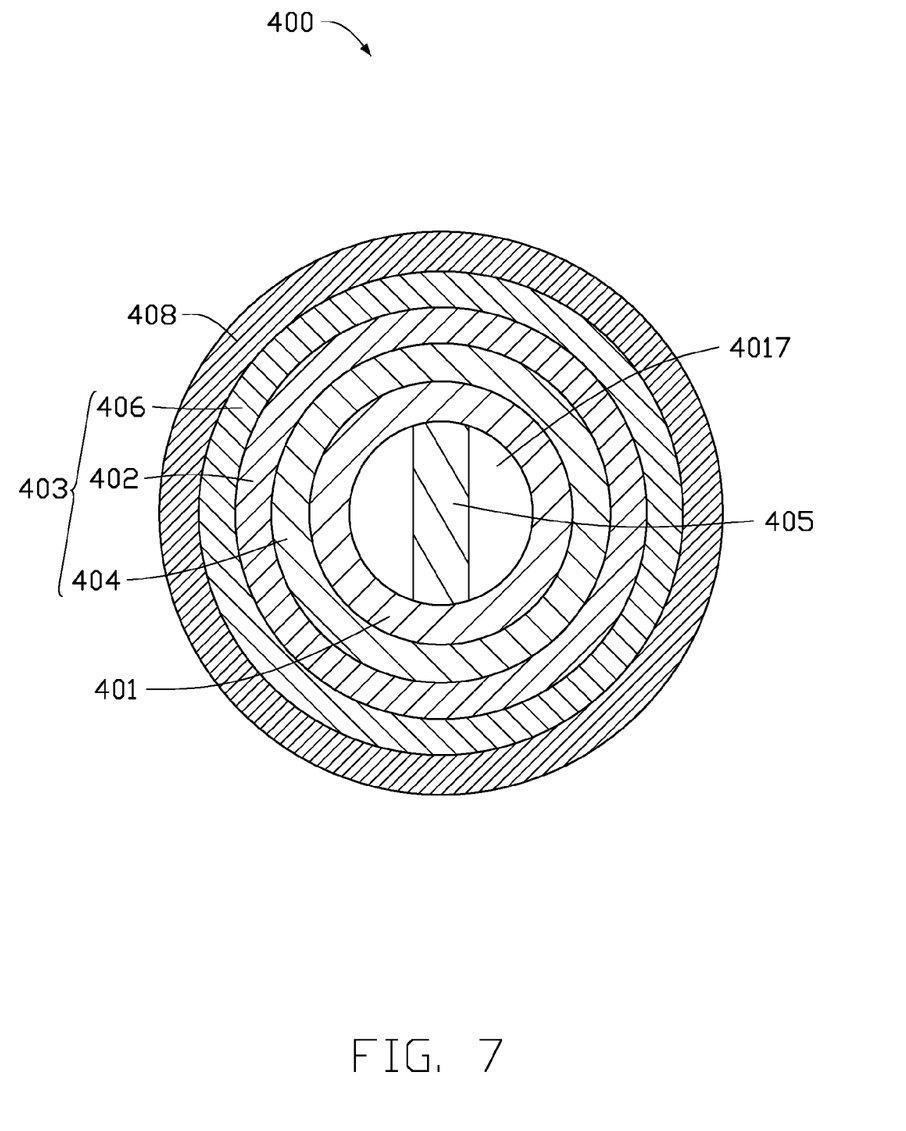
FIG. 7 is a cross-sectional view along line VII-VII of FIG. 6.

Referring to FIGS. 6-7, a fuel cell module 400 of one embodiment includes a container 401, a membrane electrode assembly 403 located on the container 401, and a first collector 408. The membrane electrode assembly 403 comprises a proton exchange membrane 402 having two opposite surfaces, a cathode electrode 404 and an anode electrode 406.

The fuel cell module 400 is similar to the fuel cell module 100 above except that the container 401 further includes a baffle 405 located therein. The baffle 405 is located in both the nozzle 4014 and the chamber 4016. The baffle 405 extends from the free end of the nozzle 4014 in to the chamber 4016 so that the space in the nozzle 4014 and the chamber 4016 is divided in to two spaces. The baffle 405 has a first side 4051 parallel with the free end of the nozzle 4014 and a second side 4052 opposite to the first side 4051. The second side 4052 is spaced from the bottom inner wall of the container 401. Thus, the two spaces in the container 401 are communicated with each other at bottom. Alternatively, when the second side 4052 of the baffle 405 is in direct contact with the bottom inner wall of the container 401, the baffle 405 can have a plurality of through holes. The reacting gas can be input the chamber 4016 from one side of the baffle 405 and output the chamber 4016 from the other side of the baffle 405. The fuel cell module 400 can improve the cycle efficiency of the reacting gas and the energy conversion efficiency of the membrane electrode assembly 403.

Figure 8:
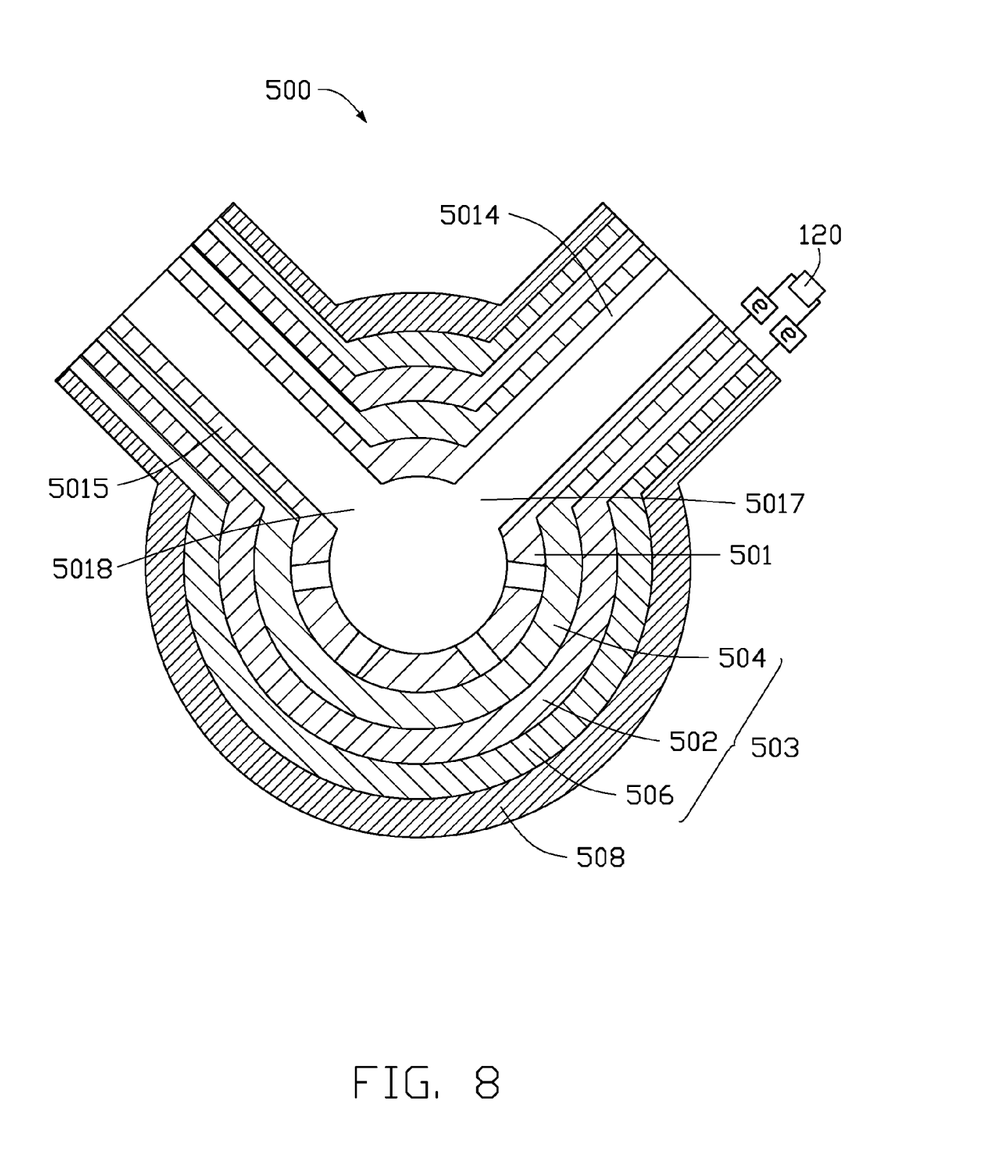
FIG. 8 is a schematic view of one embodiment of a fuel cell module.

Referring to FIG. 8, a fuel cell module 500 of one embodiment includes a container 501, a membrane electrode assembly 503 located on the container 501, and a first collector 508. The membrane electrode assembly 503 comprises a proton exchange membrane 502 having two opposite surfaces, a cathode electrode 504 and an anode electrode 506.

The fuel cell module 500 is similar to the fuel cell module 100 above except that the container 501 defines a first opening 5017 and a second opening 5018 spaced from the first opening 5017; and the container 501 includes a first nozzle 5014 connected to the first opening 5017 and a second nozzle 5015 connected to the second opening 5018. The first nozzle 5014 and the second nozzle 5015 can be parallel with each other or form an angle less than 90 degrees. The first nozzle 5014 can be used to input reacting gas, and the second nozzle 5015 can be used to output reacting gas. The fuel cell module 500 can improve the cycle efficiency of the reacting gas and the energy conversion efficiency of the membrane electrode assembly 403.

Figure 9:
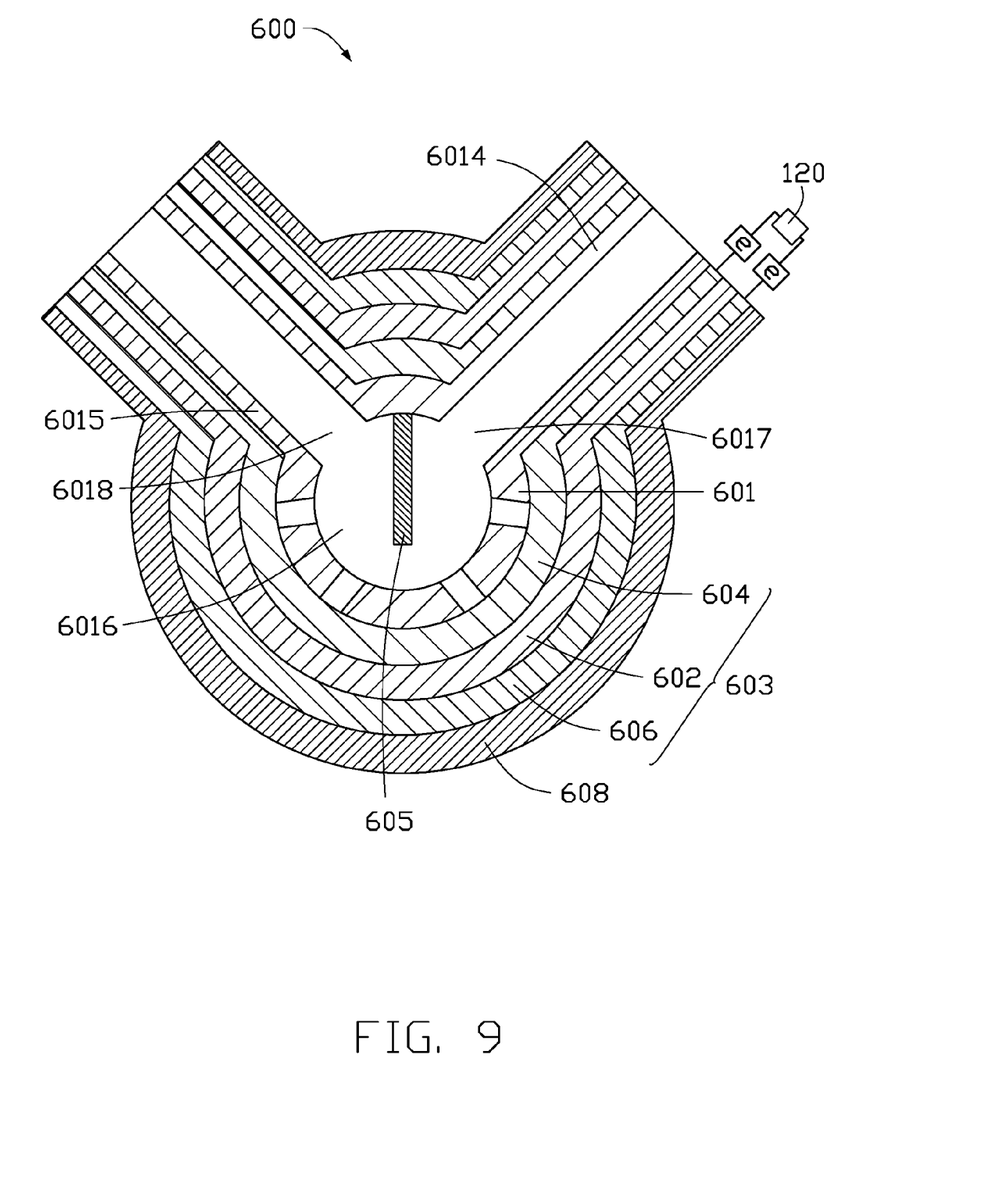
FIG. 9 is a schematic view of one embodiment of a fuel cell module.

Referring to FIG. 9, a fuel cell module 600 of one embodiment includes a container 601, a membrane electrode assembly 603 located on the container 601, and a first collector 608. The membrane electrode assembly 603 comprises a proton exchange membrane 602 having two opposite surfaces, a cathode electrode 604 and an anode electrode 606.

The fuel cell module 600 is similar to the fuel cell module 500 above except that the container 601 further includes a baffle 605 located in the chamber 6016. The first opening 6017 and the second opening 6018 are located on two opposite sides of the baffle 605. The baffle 605 divides the chamber 6016 in to a first space connected to the first nozzle 6014 and a second space connected to the second nozzle 6015. The baffle 605 has a side spaced from the inner wall of the container 601 so that the first space and the second space are communicated with each other.

Figure 10:
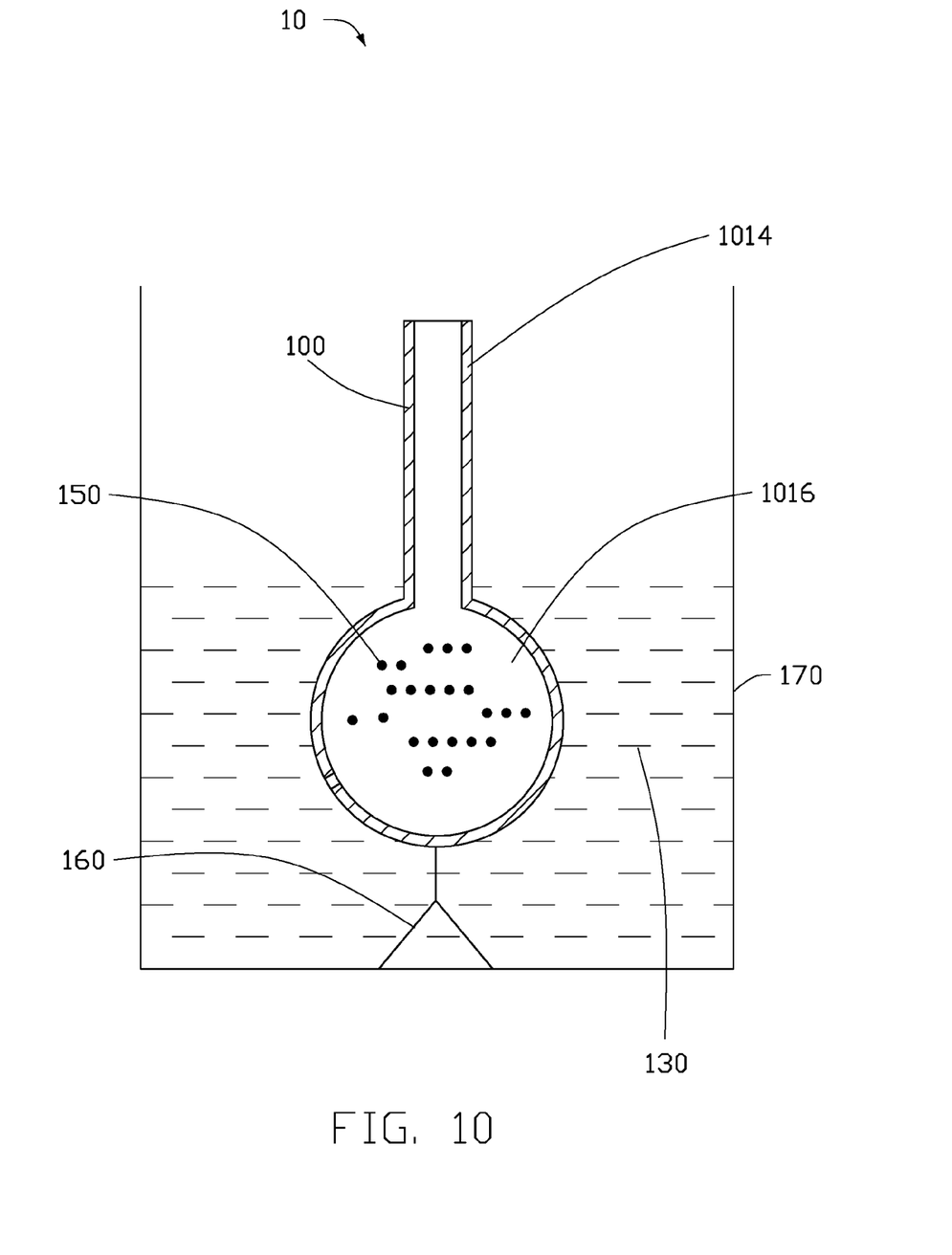
FIG. 10 is a schematic view of one embodiment of a fuel cell system.

Referring to FIG. 10, a fuel cell system 10 of one embodiment includes a fuel cell module 100, fuel 130 and oxidizing gas 150. The fuel cell module 100 can also be the fuel cell modules 200, 300, 400, 500, 600.

The fuel cell module 100 is at least partially immersed in the fuel 130 and configured to separate the fuel 130 and the oxidizing gas 150. The oxidizing gas 150 is inside of the chamber 1016, and the fuel 130 is outside of the fuel cell module 100 and surrounds the fuel cell module 100. The fuel 130 can be in direct contact with the anode electrode 106 or diffuse to the anode electrode 106 through the through holes of the first collector 108.

The depth h of the fuel cell module 100 in the fuel 130 satisfies the condition: $h<P/(\rho_1-\rho_2)g$, where, P represents the maximum pressure the fuel cell module 100 can bear, $\rho_1$ represents the density of the fuel 130, $\rho_2$ represents the density of the oxidizing gas 150, and g is a constant 9.8 N/kg. When the fuel cell module 100 is immersed in the fuel 130 with a depth h greater than $P/(\rho_1-\rho_2)g$, the pressure of the fuel 130 may damage the fuel cell module 100.

The fuel 130 is not limited and can be bioethanol, methane gas or glucose solution. The fuel cell module 100 is immersed in the fuel 130 and the nozzle 1014 extends out of the fuel 130 so that the fuel 130 would not flow in to the chamber 1016. The oxidizing gas 150 can be pure oxygen or air containing oxygen. In one embodiment, the fuel 130 is glucose solution, and the oxidizing gas 150 is air.

Furthermore, the fuel cell system 10 can include a fixing element 160 connected to the fuel cell module 100. The fixing element 160 is configured to fix the fuel cell module 100 in the fuel 130. The fixing element 160 can be a sucker or hook. In one embodiment, the fixing element 160 is a sucker in connected to the bottom of the fuel cell module 100. When the fuel cell module 100 is immersed in the fuel 130, the sucker can be fixed on the bottom surface of the pool 170.

When the fuel cell module 100 is in the shape as shown in FIG. 3, the fuel cell system 10 can further includes an device to contract and stretch the fuel cell module 100 so that the fuel cell module 100 can exchange gas with outside.

Figure 11:
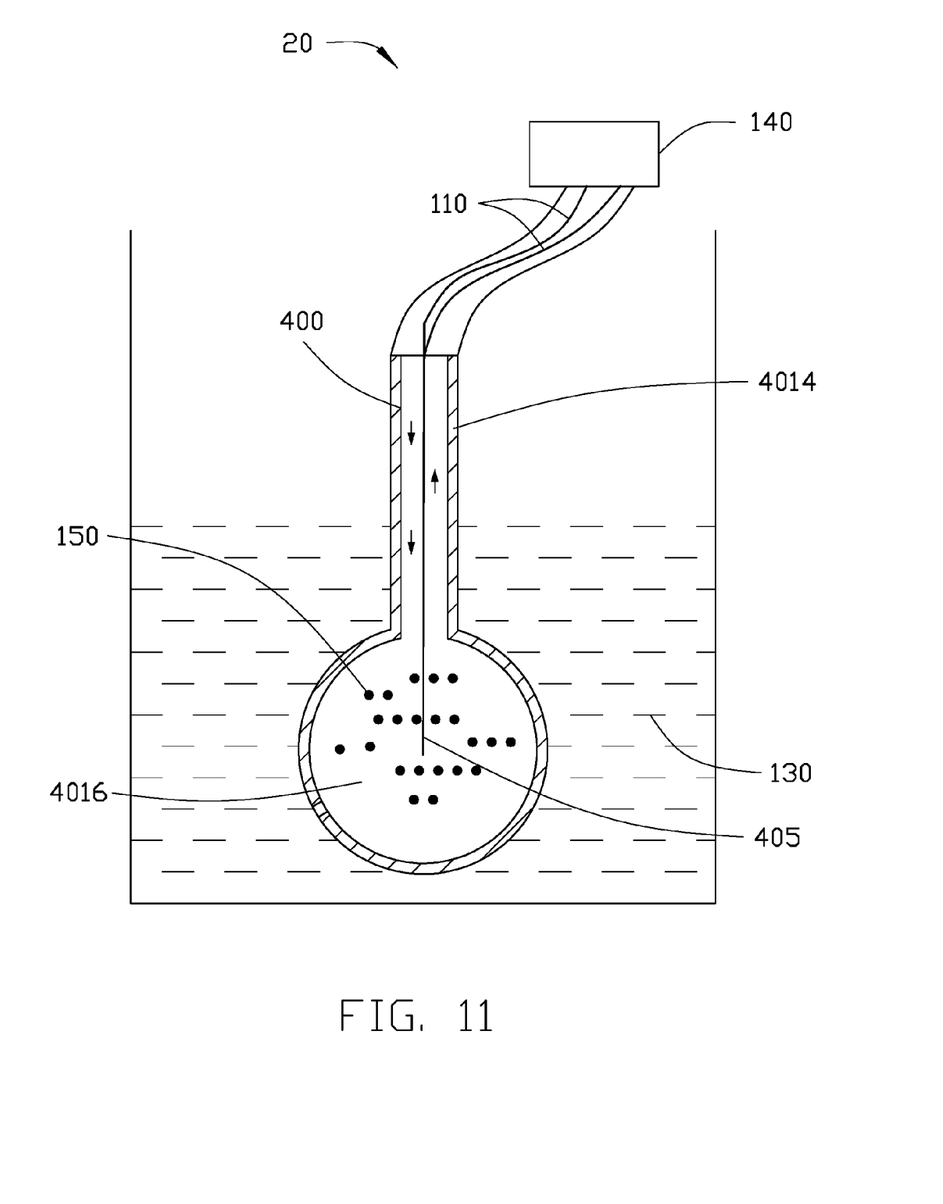
FIG. 11 is a schematic view of one embodiment of a fuel cell system.

Referring to FIG. 11, a fuel cell system 20 of one embodiment includes a fuel cell module 400, fuel 130, a gas supplying and extracting device 140 and oxidizing gas 150. The fuel cell system 20 is similar to the fuel cell system 10 above except that further includes the gas supplying and extracting device 140. The gas supplying and extracting device 140 includes blower, pump and valves (not shown). The gas supplying and extracting device 140 is connected to the end of the nozzle 1014 by two pipelines 110. The baffle 405 divides the space in the nozzle 4014 and the chamber 4016 in to two spaces. The blower of the gas supplying and extracting device 140 is connected to one of the spaces and configured to supply the oxidizing gas 150. The pump of the gas supplying and extracting device 140 is connected to the other one of the spaces and configured to extract the oxidizing gas 150.

Furthermore, when the fuel cell module 400 is replaced by the fuel cell module 500, 600 above, the blower of the gas supplying and extracting device 140 can be connected to the first nozzle 5014, 6014 and configured to supply the oxidizing gas 150. The pump of the gas supplying and extracting device 140 can be connected to the second nozzle 5015, 6015 and configured to extract the oxidizing gas 150.

Figure 12:
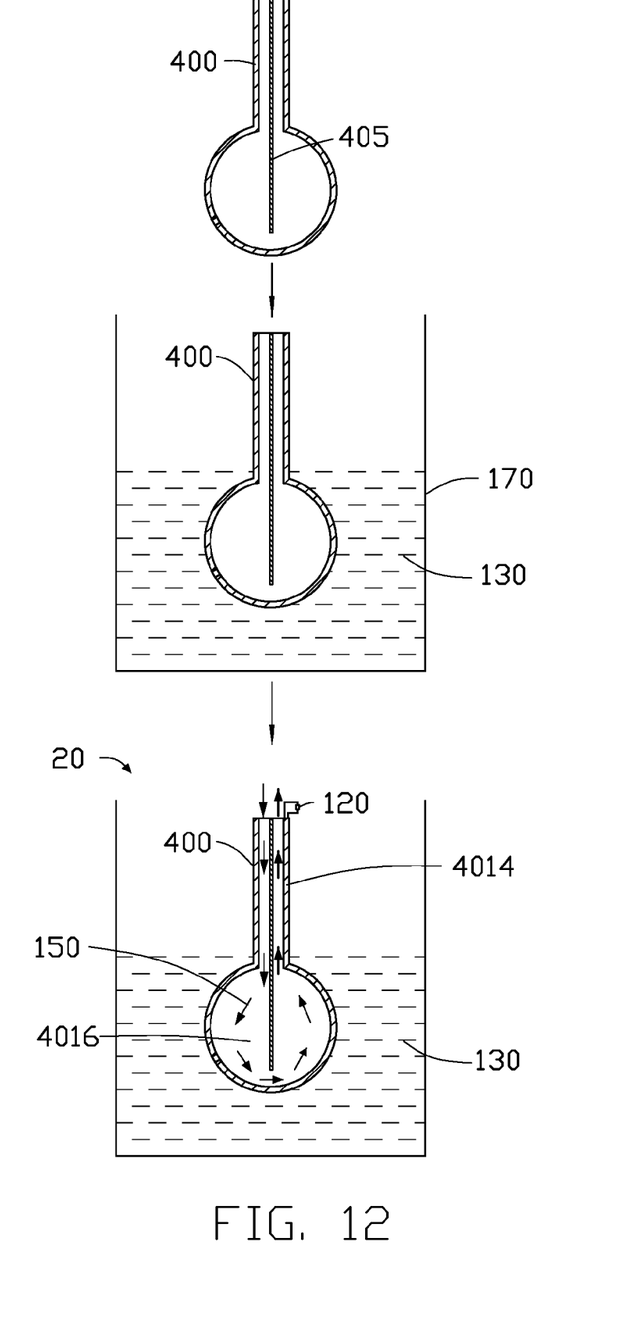
FIG. 12 is a flowchart of one embodiment of a method for making a fuel cell system.

Referring to FIG. 12, the method of making the fuel cell system 20 includes following steps:

step (S10), providing the fuel cell module 400;

step (S20), at least partially immerging the fuel cell module 400 in the fuel 130; and step (S30), supplying the oxidizing gas 150 into the chamber 4016 of the fuel cell module 400.

In step (S10), the fuel cell module 400 can also be the fuel cell modules 100, 200, 300, 500, 600 above.

In step (S20), the fuel 130 is filled in a pool 170. The fuel 130 can be made by placing the rotten materials, such as rotten fruit, rotten food or rotten vegetables, in the pool 170 filed with water and decomposing the rotten materials to form the fuel 130 in the pool 170. In one embodiment, the fuel 130 is made by placing the rotten fruit in the pool 170 filed with water and decomposing the rotten fruit to form glucose solution in the pool 170. Thus, rotten materials can be used to produce electric energy.

In step (S30), the nozzle 4014 can be connected to the gas supplying and extracting device 140 as shown in FIG. 10. The oxidizing gas 150 can be supplied and extracted by the gas supplying and extracting device 140.

In the working process of the fuel cell system 20, the reaction of glucose molecule at the anode electrode 106 is as follows: glucose→gluconic acid+2H$^+$+2e. The hydrogen ions generated by the above-described reaction reach the cathode electrode 104 through the proton exchange membrane 102. At the same time, the electrons generated by the reaction above also arrive at the cathode electrode 104 by an external electrical circuit. The oxygen of the oxidizing gas 150 reacts with the hydrogen ions and electrons at the cathode electrode 104 as the following equation: $\frac{1}{2}O_2+2H^++2e\rightarrow H_2O$. In the electrochemical reaction process, the electrons form an electrical current flowing through the load 120 in the external electrical circuit.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A fuel cell system, comprising: a fuel, a fuel cell module at least partially immersed in the fuel, and oxidizing gas; wherein the fuel cell module comprises:

a container, wherein the container comprises a housing and a nozzle, and the housing defines a plurality of through holes; the housing defines a chamber and an opening; the nozzle has a first end connected to the opening and a second end opposite to the first end; and a membrane electrode assembly located on the container and covering the plurality of through holes, wherein the membrane electrode assembly comprises a proton exchange membrane having a first surface and a second surface opposite to the first surface, a cathode electrode located on the first surface and an anode electrode located on the second surface; the membrane electrode assembly is curved and surrounds the chamber.

2. The fuel cell system of claim 1, wherein the container further comprises a baffle located in both the nozzle and the chamber.

3. The fuel cell system of claim 1, wherein the housing defines a first opening and a second opening; and the container comprises a first nozzle in connected to the first opening and a second nozzle in connected to the second opening.

4. The fuel cell system of claim 3, wherein the container further comprises a baffle located in the chamber to divide the chamber in to a first space connected to the first nozzle and a second space connected to the second nozzle.

5. The fuel cell system of claim 1, wherein a ratio between a first maximum diameter of the chamber and a second maximum diameter of the nozzle is in a range from about 1.5:1 to about 100:1.

6. The fuel cell system of claim 1, wherein the container comprises rigid materials selected from the group consisting of metal, ceramic, glass, quartz, diamond and plastic.

7. The fuel cell system of claim 1, wherein a shape of the housing is spherical, hemispherical, cylindrical or accordion shape.

8. The fuel cell system of claim 1, wherein the container comprises an outside surface and an inside surface opposite to the outside surface; and the membrane electrode assembly is located on the inside surface.

9. The fuel cell system of claim 1, wherein the container comprises an outside surface and an inside surface opposite to the outside surface; and the membrane electrode assembly is located on the outside surface.

10. The fuel cell system of claim 1, wherein the container is made of conductive material and used as a first current collector; and further comprises a second current collector so that the membrane electrode assembly is located between the first current collector and the second current collector.

11. The fuel cell system of claim 1, wherein the container is made of insulative material; the fuel cell module further comprises a first current collector located between the container and the membrane electrode assembly and a second current collector, and the membrane electrode assembly is located between the first current collector and the second current collector.

12. The fuel cell system of claim 1, wherein each of the cathode electrode and the anode electrode comprises a gas diffusion layer and catalyst dispersed on the gas diffusion layer.

13. The fuel cell system of claim 12, wherein the gas diffusion layer is a carbon nanotube layer.

14. The fuel cell system of claim 1, wherein a depth h of the fuel cell module in the fuel satisfies a condition: $h<P/(\rho_1-\rho_2)g$, where, P represents a maximum pressure the fuel cell module is capable of bearing, $\rho_1$ represents the density of the fuel, $\rho_2$ represents the density of the oxidizing gas, and g is a constant 9.8 N/kg.

15. The fuel cell system of claim 1, wherein the fuel is selected from the group consisting of bioethanol, methane gas and glucose solution.

16. The fuel cell system of claim 1, wherein the oxidizing gas is selected from the group consisting of pure oxygen or air containing oxygen.

17. The fuel cell system of claim 1, further comprising a gas supplying and extracting device connected to the nozzle.

18. The fuel cell system of claim 1, wherein the membrane electrode assembly is located on entire outside surface or entire inside surface of the housing.

19. The fuel cell system of claim 1, wherein the membrane electrode assembly is entirely immersed in the fuel.

20. A fuel cell system, comprising: a fuel, a fuel cell module at least partially immersed in the fuel, and oxidizing gas; wherein the fuel cell module comprises:
  a container, wherein the container defines a chamber and a plurality of through holes on wall of the container; and
  a membrane electrode assembly located on the container and covering the plurality of through holes, wherein the membrane electrode assembly comprises a proton exchange membrane having a first surface and a second surface opposite to the first surface, a cathode electrode located on the first surface and an anode electrode located on the second surface: the membrane electrode assembly is curved and surrounds the chamber.

* * * * *